United States Patent
Winner, Jr. et al.

(10) Patent No.: US 6,400,042 B1
(45) Date of Patent: Jun. 4, 2002

(54) ANTI-THEFT DEVICE FOR MOTOR VEHICLES

(76) Inventors: James E. Winner, Jr., 777 S. Surf Rd., Hollywood Beach, FL (US) 33019; John Rutkowski, 310 Huddleston, Cuyahoga Falls, OH (US) 44221

( * ) Notice: Subject to any disclaimer, the term of this patent is extended or adjusted under 35 U.S.C. 154(b) by 921 days.

(21) Appl. No.: 08/512,065

(22) Filed: Aug. 7, 1995

Related U.S. Application Data

(63) Continuation-in-part of application No. 08/014,560, filed on Feb. 8, 1993.

(51) Int. Cl.[7] .............................................. G08C 19/00
(52) U.S. Cl. ................ 307/10.5; 307/10.2; 307/10.3; 180/287; 340/426
(58) Field of Search ................ 307/9.1–10.8; 340/425.6, 426, 429, 439, 441, 466, 467, 825.32, 825.34, 825.54, 825.69, 825.72, 539; 180/287; 123/198 D, 198 DB, 198 DC, 198 B; 364/424.01, 424.03, 424.04, 424.05, 424.06

(56) References Cited

U.S. PATENT DOCUMENTS

| | | | | |
|---|---|---|---|---|
| 3,665,386 A | * | 5/1972 | Dosch | 180/287 |
| 3,788,422 A | * | 1/1974 | Bowler | 307/10.4 |
| 4,004,273 A | * | 1/1977 | Kalogerson | 307/10.2 |
| 4,452,197 A | * | 6/1984 | Weber | 180/287 |
| 4,763,121 A | * | 8/1988 | Tomoda | 340/825.69 |
| 5,160,914 A | * | 11/1992 | Sato | 340/426 |
| 5,412,370 A | * | 5/1995 | Berman | 340/426 |
| 5,444,430 A | * | 8/1995 | McShane | 340/426 |

FOREIGN PATENT DOCUMENTS

WO    WO 92/02911    * 2/1992

* cited by examiner

Primary Examiner—Albert W. Paladini

(57) ABSTRACT

An anti-theft device for a motor vehicle wherein a personal identification unit is carried by an authorized operator of said motor vehicle and includes means for identifying its location in the vicinity of the motor vehicle. A vehicle control unit mounted onto the motor vehicle, has a first and second condition with means for allowing operation of the motor vehicle when the control unit is in the first condition and means for inhibiting operation of the motor vehicle when said control unit is in the second condition and means for shifting the control unit into the second condition at a time subsequent to removal of the identification device from the vicinity of the motor vehicle and/or upon the occurrence of a predetermined condition of movement of the vehicle subsequent to removal of the identification device from the vicinity of the vehicle.

5 Claims, 7 Drawing Sheets

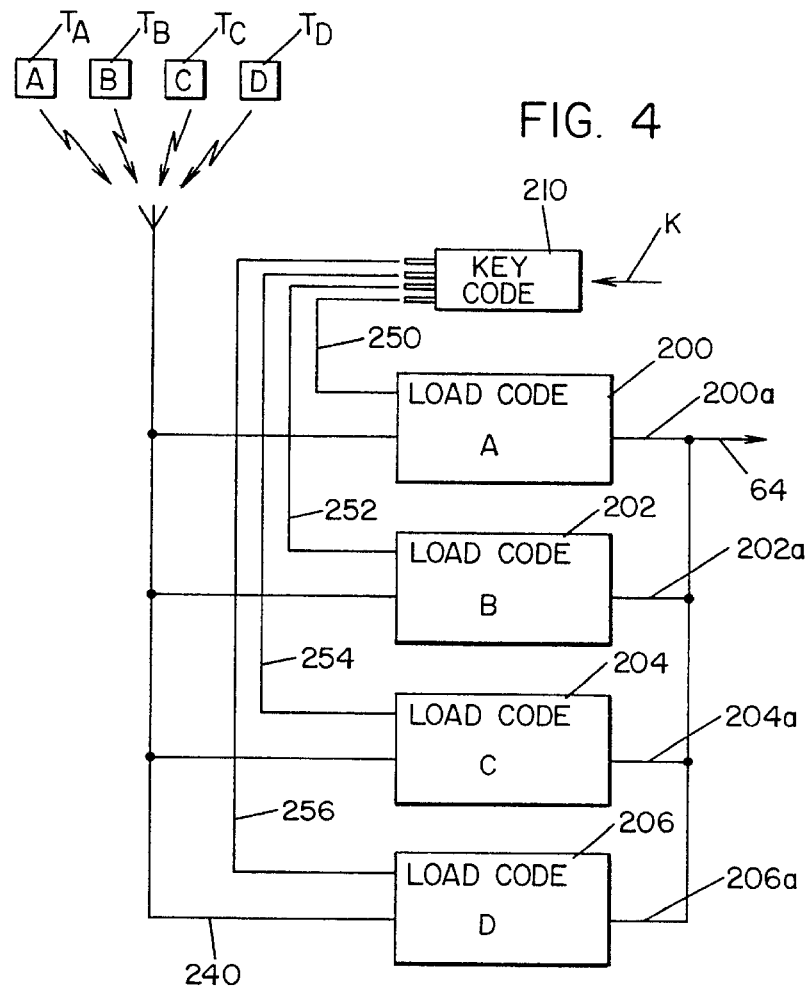
FIG. 4
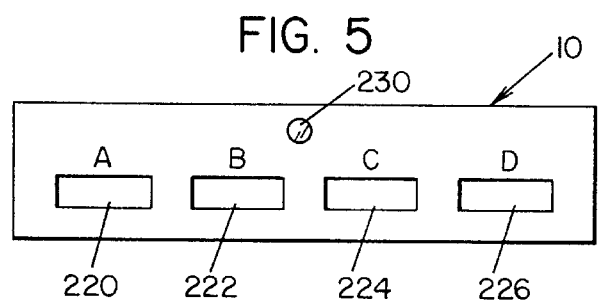
FIG. 5

ANTI-THEFT DEVICE FOR MOTOR VEHICLES

This application is a continuation-in-part of application Ser. No. 08/014,560, filed Feb. 8, 1993.

The present invention relates to the art of anti-theft devices for motor vehicles and more particularly to a device which will thwart attempts by criminal elements to forcibly commandeer a vehicle from an authorized operator.

The invention has particular application to preventing the escalating incidences of physical commandeering of motor vehicles occurring primarily in urban areas and it will be described with particular reference thereto; however, the invention has broader applications and is extremely effective in preventing theft of a vehicle after it has been parked by an authorized operator. Also the invention allows programmed operation of accessories associated with the vehicle upon approach and retreat of the authorized operator of the motor vehicle or when the vehicle is parked and unattended. Consequently, it is appreciated that the invention has these broader applications even though particular emphasis is applied to its primary goal of hampering or thwarting commandeering of motor vehicles.

There are a tremendous number of anti-theft devices for motor vehicles, many of which are now on the market. In addition, many motor vehicles are provided from the factory with integrated security or theft prevention systems. After a vehicle has been purchased, professional persons can be employed for applying sophisticated security systems or anti-theft devices on the motor vehicle. Such complicated systems are extremely expensive and can be installed only by the most talented persons and are not susceptive to "Do It Yourself" vehicle owners, a group of persons that substantially outnumber those who can afford professionally installed, or factory installed, security devices. Relatively inexpensive, easily installed security devices are generally simplistic in operation and merely prevent theft of a vehicle, while the vehicle is unattended. In these devices, when an authorized operator enters the vehicle, the security device is deactivated by some unspecified act. Indeed, this situation is normally true of factory installed and professional installed security systems. Consequently, security systems of both the inexpensive type and the professionally installed type do not, in any way, protect from or hamper a hijacking situation where a criminal element physically ejects an authorized operator and steals the motor vehicle. Thus, there is a substantial need for a device which will prevent or indeed in some way hamper, thwart or discourage hijacking of motor vehicles. Such a device would not only reduce loss of property but could also result in apprehension of criminal elements disposed to the criminal activity of physical violence directed toward theft of a motor vehicle. In addition, it would be a tremendous advantage if such device were also installed by a Do-It-Yourself person.

THE INVENTION

In accordance with the present invention, there is provided an anti-theft device which can be easily attached to a motor vehicle, which device will thwart or hamper hijacking, as well as prevent theft of an unattended vehicle. In accordance with preferred embodiments of the invention, the anti-theft device is a passive system which will be armed and disarmed without physical intervention of the operator owner. This type of system is considered beneficial and premium reducing to some insurance carriers.

In accordance with one aspect of the present invention there is provided an anti-theft device for a motor vehicle, which device comprises a personal identification unit (PID) to be carried by an authorized operator of the motor vehicle. This personal identification device (PID) has means for identifying its location in the vicinity of the motor vehicle. In other words, the PID is used to indicate when an authorized operator is in the vicinity of the vehicle. The present invention further includes a vehicle control unit mounted onto the motor vehicle so that the vehicle control unit can be shifted between a first condition and a second condition. The first condition will allow operation of the motor vehicle, whereas the second condition will inhibit operation of the motor vehicle. In accordance with this aspect of the invention, the control unit on the vehicle is shifted into the second, or inhibiting, mode of operation at a time subsequent to removal of the PID from the vicinity of the motor vehicle. In this manner, as the PID is carried by the authorized operator of the vehicle, the vehicle mounted control unit shifts to a first condition as the operator approaches the vehicle. When the operator retreats from the vehicle, the control unit automatically shifts into its second condition. This shifting of the control unit occurs after a time delay which, in practice, is approximately two minutes. In this manner, when the operator walks away from the vehicle, the control unit automatically inhibits operation of the vehicle. Consequently, hijacking of the vehicle is prevented. If the person carrying the PID is physically ejected from the vehicle, the person commandeering the vehicle can not drive the vehicle a substantial distance. The control unit will be shifted into the second condition inhibiting operation of the vehicle. Since the preferred embodiment of the invention includes a time delay, in practice two minutes, as the vehicle is commandeered and the operator is removed, the vehicle operates for a short period of time. When the vehicle is parked and left unattended by the operator carrying the PID, the control unit shifts into the second condition and the vehicle can not be operated. This prevents theft of the vehicle while it is unattended. Indeed, a vehicle equipped with the invention could be unattended with the keys in the ignition switch and the doors open. Although this scenario would be unwise and could invite an attempt to steal the vehicle, such attempt would be unsuccessful.

In accordance with another aspect of the present invention, the anti-theft device can be installed on a motor vehicle merely by cutting a lead to the ignition coil and installing the unit in series with the ignition coil. In this manner, the first condition of the anti-theft control unit connects the ignition coil in a normal fashion. This occurs when the personal identification device is in the vicinity of the vehicle. Vicinity means less than about 50 feet. The second condition of the anti-theft device opens the circuit to the ignition coil, thus preventing operation of the vehicle.

In accordance with another aspect of the present invention, the personal identification device, or unit, is a small transmitter carried by an authorized operator of the motor vehicle. The transmitter has means for periodically transmitting an electromagnetic signal having a series of coded pulses, which arrangement of pulses is unique to the particular transmitter. The transmitter identifies an authorized operator of the vehicle. The control unit mounted onto the vehicle includes a receiver that has a decoding network for recognizing the unique coded pattern of the signal from the transmitter carried with the authorized operator of the vehicle. In this manner, as the operator approaches the vehicle, the coded signal is transmitted to the receiver on the vehicle. This signal shifts the control unit into the first condition. Consequently, the motor vehicle can be operated normally. As the operator retreats from the vehicle, or the vehicle drives away from the operator, the transmitted signal is no longer received by the decoder. After a preselected time, the control unit on the vehicle creates a signal indicating that the transmitter has been removed. This signal inhibits the operation of the motor vehicle by ultimately disabling the vehicle.

In accordance with another aspect of the invention, the vehicle is inhibited after a given time following removal of the PID from the vicinity of the vehicle. This given time is generally greater than one minute and is preferably in the range of two minutes. To prevent the vehicle from abruptly shutting down, another aspect of the invention includes a programmed stall sequence system wherein the vehicle inhibiting means gradually shifts to an absolute inhibit condition for the vehicle. In accordance with a practical embodiment of the stall sequence system of the present invention, following the time delay after removal of the PID from the vehicle, the ignition coil is first deactivated for about 65 ms. Thereafter, the ignition coil is activated for 10.0 seconds. The stall sequence cycles between coil off and coil on. The first time, i.e. the time of coil deactivation or off, is gradually increased in the subsequent stall sequence. The time of activation, when the ignition coil is connected to the battery and on, is progressively decreased. By increasing the first time and deceasing the second time alternately, ultimately the first time prevails and the vehicle is inhibited. By using this stall sequence, which lasts for about one minute, all vehicles will gradually come to a stop. Consequently, the vehicle is not immediately shut down. Such immediate vehicle shut down could result in loss of brakes, loss of steering, loss of lights, and just general havoc to a normal operation of the vehicle. By incorporating the unique and novel stall sequence of the present invention, the commandeered motor vehicle gradually becomes inoperative and the person stealing the vehicle has no option but to leave the vehicle on foot and risk apprehension. Although the preferred embodiment of the invention includes a time delay from shifting from the operating, condition to the inhibit condition, it is possible to employ the present invention without such time delay.

In accordance with the broad aspect of the present invention as thus far described, there is provided an anti-theft device for a motor vehicle comprising a unique device (PID) adapted to be carried by an authorized operator of the motor vehicle, means for creating a vehicle inhibit signal when the unique device has been removed from the vicinity of the motor vehicle for a given time and means for inhibiting operation of the vehicle upon creation of the signal by removal of the PID from the area or vicinity of the vehicle. In accordance with this concept, the unique device is a transmitter for transmitting a coded signal to the vehicle while the transmitter is in the vicinity of the vehicle. In accordance with this aspect of the invention, the coded signal is transmitted periodically. In the preferred embodiment, the period of transmission of the coded signal from the transmitter, or PID, is 10.1 seconds. If the receiver does not receive a properly coded transmitted signal from an authorized transmitter within 2.0 minutes, a monitoring reset timer or timer sequence of a microprocessor times out and shifts the system from a first condition allowing operation of the vehicle to a second condition inhibiting operation of the vehicle. This second condition is processed by a microprocessor that implements the stall sequence, which operates a breaker in the ignition coil circuit to activate and deactivate the coil in accordance with the stall sequence as previously described. In this manner, the anti-theft device is passive. Removal of the transmitter carried by the operator from the vicinity of the vehicle prevents operation of the vehicle. If the vehicle is being commandeered it can be operated for a period of time until the stall sequence has progressed to completely deactivate the ignition coil of the vehicle. By using this concept of a time delay as well as a stall function, the vehicle is driven away from the victim and shuts down at a location substantially removed from the crime scene. For this reason, the timer stage is set for approximately 2.0 minutes and the stall function occurs within approximately one minute. Since hijacking normally involves a speedy escape by the criminal element, this timing allows the vehicle to remove itself substantially from the victim and then shut down.

In accordance with yet another aspect of the present invention, hijacking of a motor vehicle is thwarted by shifting the control unit on the vehicle from the enabling condition to the inhibit condition in response to a first control signal indicative of the fact that the vehicle is being commandeered from the authorized operator and a second control signal indicative of a predetermined condition of vehicle movement during the hijacking operation. Preferably, the first control signal is that produced by the control unit as described above when the personal identification device carried by the authorized operator of the vehicle is removed from the vicinity of the vehicle as the latter is driven away by the hijacker, whereby the transmitter signal is no longer received by the control unit. In accordance with this aspect of the invention, however, the transmitter carried by the authorized operator could be manually operable, while still in range with respect to the vehicle, whereupon the receiver in the control unit would create the first control signal indicative of operator ejection. Further in accordance with this aspect of the invention, the rate of movement of the vehicle being hijacked is detected or sensed and, upon the occurrence of a predetermined or preselected condition regarding vehicle movement, the control unit on the vehicle responds to the two control signals and shifts into the second condition inhibiting operation of the vehicle. This advantageously enables providing for inhibiting of the vehicle to take place at a low speed of movement thereof, preferably less than 10 miles per hour and, for example, at about 5 miles per hour.

It will be appreciated that inhibiting operation of the vehicle at low speeds, either by immediately opening the ignition system or by employing a stall sequence as described above, advantageously minimizes the potential for damage to the vehicle and/or physical injury to innocent bystanders resulting from loss of the vehicle brakes, steering, lights and the. like through the inhibiting operation. At the same time, selectivity with respect to the speed condition necessary for generating the second control signal advantageously enables providing for the inhibiting operation to take place after the hijacker is sufficiently removed from the vicinity of the hijacking operation, thus to protect the vehicle owner by enabling the latter to evacuate the hijacking location. Any number of rate-of-movement conditions can be selected for controlling issuance of the second control signal such as, for example, the first time the vehicle decelerates through a preselected rate of movement, such as 5 mph, the second time the vehicle accelerates through the preselected rate of movement, or a predetermined one of a plurality of successive accelerations and decelerations through the preselected rate of movement. Still further, it will be appreciated that issuance of the control signal based on rate of vehicle movement can be delayed for a preselected time following issuance of the first control signal, thus combining time with the inhibiting operation to assure adequate distancing of the stolen vehicle from the owner. In this respect, for example, the inhibiting operation could be designed to take place during the first acceleration or deceleration through the preselected rate of movement occurring at a preselected time after issuance of the first control signal. As yet another example, the number of accelerations and decelerations through the preselected speed can be counted within the computer and the latter programmed to initiate the vehicle inhibiting function at a predetermined count of accelerations, decelerations or successive accelerations and decelerations. In any event, since a vast majority of vehicle hijackings take place within a city or community, inhibiting of a hijacked vehicle will take place far enough away from the authorized operator to optimize his or her safety yet close enough to the scene of the hijacking as to optimize recovery of the vehicle and perhaps apprehension of the hijacker.

In accordance with another aspect of the present invention, the vehicle mounted control unit can be programmed to include more than one authorized PID transmitter. In addition, it can be used to operate windows, lights, sirens, and other accessories.

In accordance with another aspect of the present invention, there is provided a method of preventing theft of a motor vehicle and/or hampering and thwarting hijacking of a motor vehicle.

The primary object of the present invention is the provision of an anti-theft device for a motor vehicle, which device preferably is passive in operation and deactivates the car when an authorized operator is out of the vicinity of the vehicle.

Still a further object of the present invention is the provision of a control unit to be mounted on a motor vehicle, which control unit can be easily installed by a person, other than a professional.

Still a further object of the present invention is the provision of an anti-theft device, and method of operating the same, which device and method allow a car to be removed from an authorized operator but stalled in a short distance.

Yet another object of the invention is the provision of an anti-theft device, and method of operating the same, which device and method allow a vehicle to be confiscated from an authorized operator while providing for inhibiting operation of the vehicle thereafter when the vehicle has moved a safe distance away from the authorized operator, and inhibiting operation of the vehicle in a manner which optimizes protecting pedestrians and other innocent bystanders from potential injury and protecting the stolen vehicle from damage by initiating the inhibiting operation when the vehicle is moving at a slow speed.

Still a further object of the present invention is the provision of a device and method, as defined above, which device and method are somewhat inexpensive, can be universally adapted for a variety of accessories and is easily installed by a Do-It-Yourself person having limited skills and tools.

These and other objects and advantages will become apparent from the following description taken together with the accompanying drawings.

BRIEF DESCRIPTION OF DRAWINGS

FIG. 4 is a modification of the preferred embodiment of the present invention wherein the vehicle mounted control unit is adapted to be programmed for accepting more than one transmitter for operating the preferred embodiment of the present invention;

FIG. 5 is a front plan view of the module constituting the motor vehicle mounted control unit of the preferred embodiment of the present invention;

PREFERRED EMBODIMENT

Figure 1:
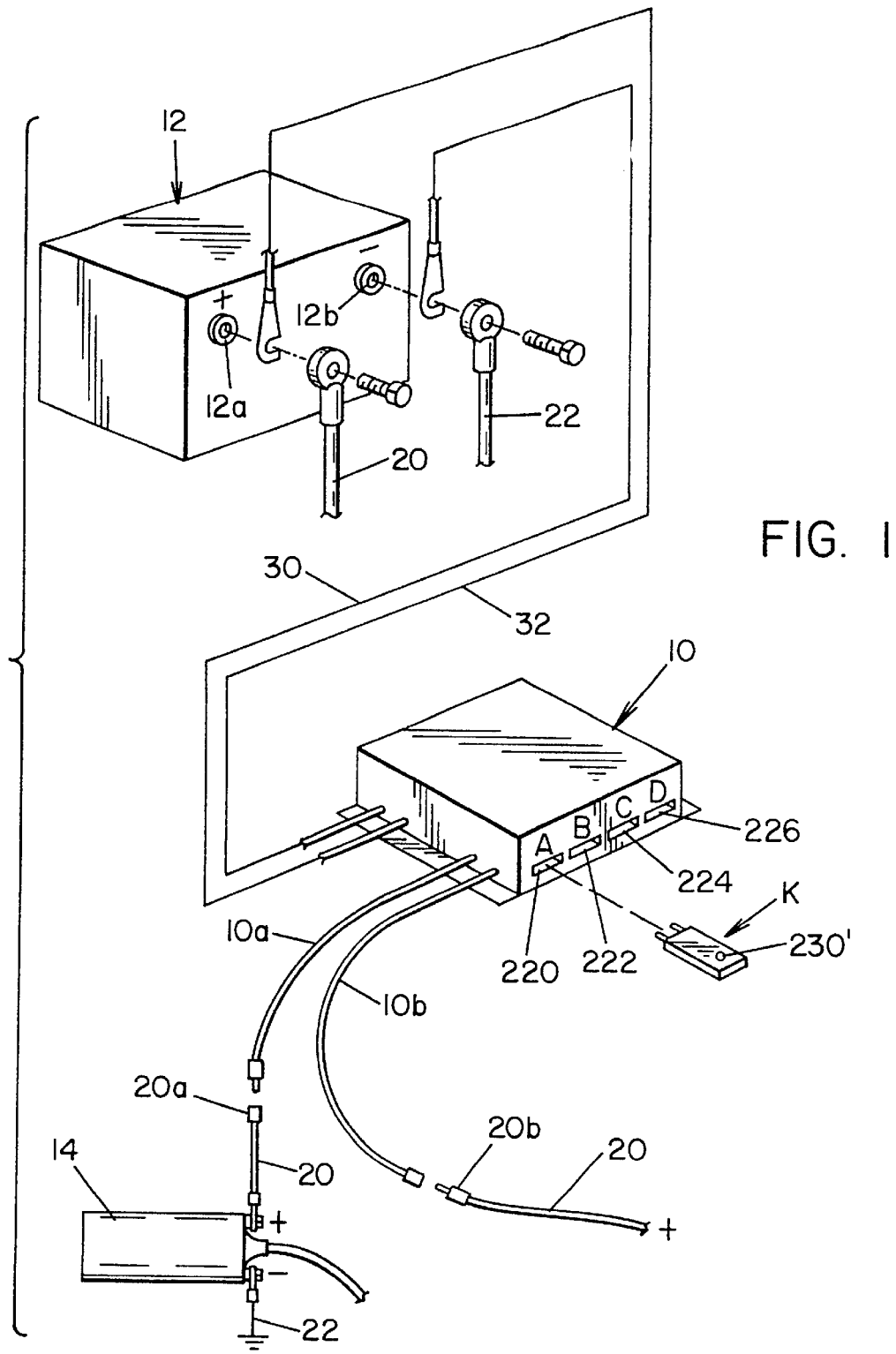
FIG. 1 is an exploded pictorial view of the preferred embodiment of the present invention illustrating its use with the ignition coil of a motor vehicle.

Referring now to the drawings wherein the showings are for the purpose of illustrating a preferred embodiment of the invention only and not for the purpose of limiting same, FIG. 1 illustrates a connection of the preferred embodiment of the present invention wherein. the anti-theft control unit 10 is connected in a system including a standard motor vehicle battery 12 and an ignition coil 14. Battery cables 20, 22 provide power to coil 14 for the purpose of operating the motor vehicle. As is known, when coil 14 is inoperative, the internal combustion engine powering the motor vehicle will be rendered inoperative. In accordance with the preferred embodiment of the present invention, control unit 10 includes a microprocessor and is powered by leads 30, 32 form standard battery 12. Connection of control unit 10 on a motor vehicle includes mounting the unit by bolts in an inaccessible location. The battery cable 20 is then cut adjacent coil 14 to provide spaced ends 20a, 20b. These spaced ends are provided with electrical fasteners and to leads 10a, 10b forming the output of control unit 10, as shown in FIG. 1. By making the cut in the power supply line of coil 14, and providing electrical fasteners at the cuts for joining with leads 10a, 10b, unit 10 is easily installed. This installation can be done by a person with relatively minor knowledge of the electrical system of a motor vehicle. Battery cables 20, 22 are removed from battery terminals 12a, 12b for connection of power leads 30, 32. In this manner, the anti-theft device, constituting control unit 10, is easily installed in a motor vehicle with very few tools and a minor amount of technical knowledge.

Figure 2:
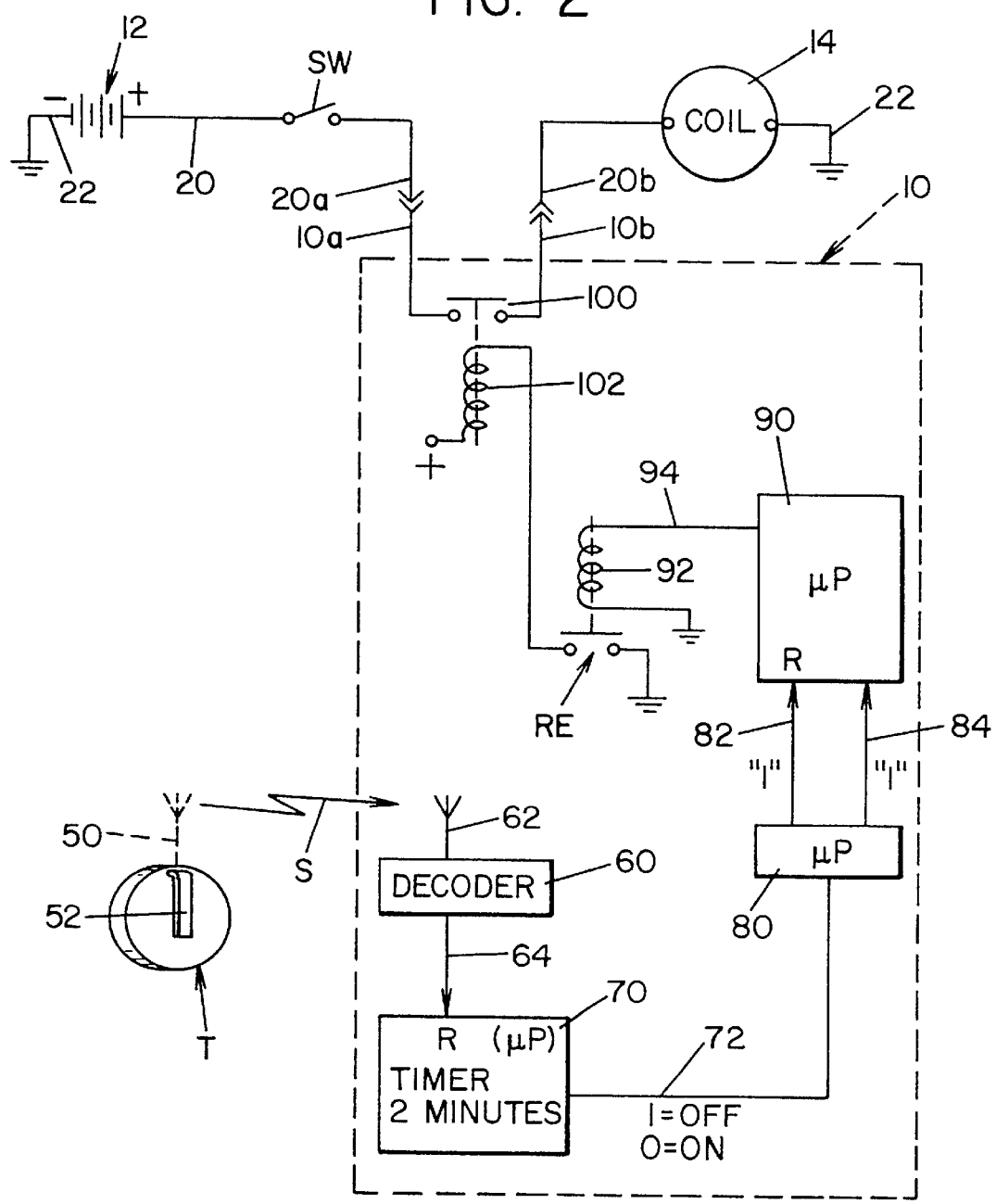
FIG. 2 is a wiring diagram schematically illustrating the preferred embodiment of the present invention.

Referring now to FIG. 2, a schematic wiring diagram of the control unit 10 is illustrated, together with the personal identification device or transmitter T, which PID transmits a series of electromagnetic coded signals S at short intervals. Transmitter T is carried by an authorized operator of the motor vehicle onto which unit 10 is mounted and includes an antenna 50 and a clip 52 for mounting the transmitter onto the person of the authorized operator. Of course, transmitter T could be carried in the clothing of the operator or otherwise carried by the operator to maintain signal S transmitting to unit 10 when the transmitter T is in the vicinity of the motor vehicle. Vicinity is a relative term and is meant to mean preferably approximately 5–20 feet or generally less than about 50 feet from the motor vehicle. After the transmitter T is beyond the vicinity of the vehicle, signal S is no longer available for detection by unit 10. In accordance with the preferred embodiment, the vehicle mounted unit 10 includes a decoder 60 having an antenna 62 and an output 64. Signal S has a unique multiple bit. digital signal which is transmitted serially and periodically to unit 10. Only this unique coded signal can be recognized and acknowledged by decoder 60. This concept is standard digital practice. When a signal having the desired unique code set into decoder 60 is received by the decoder, a signal is transmitted by the output 64 to a reset timer 70. In practice the timer is formed as part of the microprocessor used in control unit 10. Of course, the timer 70 could be a reset timer formed of discrete circuit components. The timer, in accordance with the preferred embodiment of the invention, produces a logic 1 in output 72 when the timer expires without a reset signal in line 64. Expiration time of timer 70 is, in practice, 2.0 minutes. Consequently, if a signal in line 64 is not received within 2.0 minutes, the output line 72 shifts from a first condition allowing operation of the motor vehicle to a second condition indicated as a logic 1. This second condition inhibits operation of the motor vehicle in accordance with the present invention. Output 72 is directed to stage 80 of the microprocessor which identifies whether the motor vehicle is to be operated. A logic 0 in line 72 is a reset signal resetting stage 90 of the microprocessor by a logic 1 in line 82. Consequently, when output 72 is in the first condition allowing operation of the vehicle, stage 80 has a logic 1 output in line 82 which resets stage 90 of the microprocessor in unit 10. Upon receipt of a logic 1 by stage 80, a logic 1 appears in line 84 instead of a logic 1 in line 82. Thus, a logic "1" appears in line 82 and a logic 1 appears in line 84 when a logic 1 appears in line 72. This digital condition initiates the stall sequence described in more detail in FIG. 3 and implemented in stage 90 of the microprocessor. The stall sequence as will be described later, opens and closes the power to coil 14. This is done in the microprocessor. This function is schematically illustrated as a relay RE having a coil 92 controlled by output 94 from microprocessor stage 90. Microprocessor stage 90 is the inhibit arrangement for inhibiting the operation of the motor vehicle by gradually stalling the motor vehicle through operation of stage 90 in the manner illustrated in FIG. 3. Relay RE is normally closed when the vehicle is to be operated. Relay RE operates breaker 100 through a coil 102 adjacent lines 20*a*, 20*b*. This power breaker 100 is mounted, in the preferred embodiment, within control unit 10. Of course, it could be a separate, discrete component outside unit 10 if desired. Breaker 100 is normally opened as shown in FIG. 2. When relay RE is closed, breaker 100 is closed to allow operation of the coil 14 as long as ignition switch SW is closed.

In operation, so long as transmitter, or personal identification device T, is in the vicinity of unit 10, a reset signal periodically appears in line 64. This maintains reset timer stage 70 in its reset condition with a logic 0 in line 72. A logic 1 appears in line 82 from stage 80 to maintain the stall sequence in stage 90, of the microprocessor in the reset condition. A logic 1 appears on line 94 closing relay RE and, thus, closing breaker 100. The motor vehicle operates normally. When the operator leaves the vehicle with transmitter T, a signal is no longer received periodically by decoder 60. Thus, a reset signal does not periodically appear on line 64. Reset timer stage 70 times out shifting output 72 from a first condition allowing operation of the vehicle to a second condition inhibiting operation of the vehicle. This second condition is represented by logic 1 in line 72, which logic causes a logic 1 to appear in line 84. This initiates the stall sequence of stage 90. The stall sequence, as disclosed in FIG. 3, ultimately causes a logic 1 to appear in line 94. This permanent or sustained logic 1 opens relay RE. When the relay RE is opened, breaker 100 is opened since it assumes its normal position. Of course, other arrangements for the relay RE and breaker 100 could be used. A normally opened breaker could be employed if desired. However, the normal position would be indicative of a logic 1 or second condition in line 72.

Figure 3:
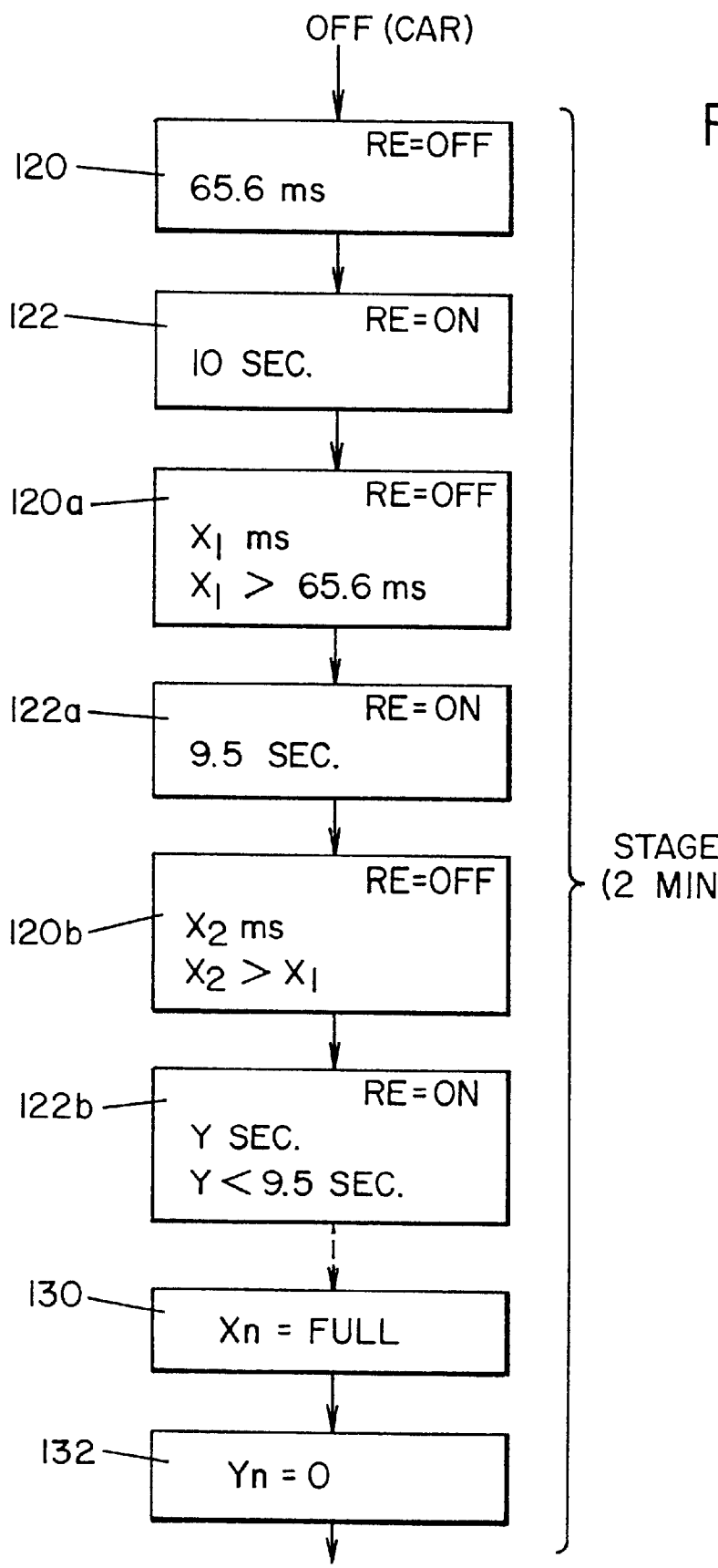
FIG. 3 is a flow chart and block diagram of the programmed stall sequence system employed in the preferred embodiment of the present invention.

The stall sequence of stage 90 is schematically illustrated in FIG. 3 wherein a logic 1 in line 84 commences the sequence for stalling the vehicle gradually. At the first instance, block 120 creates a logic 0 in line 94. This occurs for 65.6 milliseconds. Such signal opens breaker 100 as shown in FIG. 2 for a very short period of time. Thereafter, a logic 1 appears in line 94 for 10.0 seconds. Thus, coil 14 can operate normally for 10 seconds. After 10 seconds, a logic 0 appears in block 120*a* for a time $X_1$. This time is greater than 65.6 milliseconds. Thereafter, a logic 1 appears in line 94 causing coil 14 to be activated for 9.5 seconds. This sequence between block 120 and block 122 continues gradually increasing the time that the coil is inactive and gradually decreasing the time when the coil is active, until reaching blocks 130, 132 where the logic 0 remains on line 94 and breaker 100 is maintained opened. The stall sequence could take a variety of configurations. By using the stall sequence, the vehicle shuts down gradually. The vehicle gradually loses power until the vehicle can no longer operate. This allows brakes, power steering, and other accessories to be operative for the purposes of steering the vehicle off the roadway and gradually stopping the vehicle. The person stealing the vehicle and leaving transmitter T behind merely experiences a gradual shut-down of the motor vehicle. This is sufficient to allow parking the vehicle at the side of the roadway. Under no circumstance can the vehicle be moved further. Thus, after two minutes without the transmitter in the vicinity of unit 10, the vehicle starts into the stall sequence. The stall sequence, in practice, lasts 1.0 minutes. Since the vehicle is normally driven away quite rapidly, the person commandeering the vehicle in a high tension situation will be many blocks from the victim before the vehicle is stalled.

The present invention is particularly applicable for preventing hijacking of a vehicle by stalling the vehicle at a remote location from the actual hijacking location. Of course, when the vehicle is parked and the operator leaves the vehicle, the personal. identification device or transmitter T is removed. This causes unit 10 to shut down the motor vehicle in the parked unattended condition. Consequently, device 10 also performs an anti-theft prevention function. It is possible to use unit 10 to operate auxiliary components. This can be combined with a device for sensing whether the alternator is operating to know whether the vehicle is operating or parked. In normal entry, the transmitter signal is received by unit 10 and the alternator is off. In this instance, an auxiliary system is employed for unlocking the doors and enabling the ignition system by unit 10. If the vehicle is being driven the transmitter in the vehicle and the alternator is operating. Thus, device 10 enables and maintains the ignition system as illustrated in FIG. 2. When the person exits the vehicle, the PID or transmitter is removed.

The alternator had been operating; therefore, after two minutes, the ignition is progressively shut down in accordance with the stall sequence of FIG. 3. It is possible to apply auxiliary accessories to lock the doors in this situation. If the automobile is hijacked, which indicates a removal of the transmitter while the alternator is operating, the vehicle waits for two minutes before it is stalled in accordance with the sequence of FIG. 3. Since the transmitter is still gone, remotely connected accessory components can be used to lock the doors, close the windows and, after the stall sequence has been implemented, disconnect the main light switch, raise the head light door, pulse the lights, and pulse a siren to signal the fact that this vehicle is being operated by someone not authorized. When the transmitter is then returned, the stall sequence is immediately deactivated by enabling the ignition. This will stop the pulsing of the lights and operation of the siren, reconnect the main highlights, return the headlamp door to driver control and allow normal driving. All of these functions can be employed by connecting external accessories to an I/O board on unit 10. The board is connected to external relays for sequencing the external accessories in accordance with the existing condition of the vehicle. The existing condition can be determined and identified by the condition of the alternator, in combination with the location of the transmitter or personal identification device T.

Referring now to FIG. 4, in some instances it is necessary to operate control unit 10 by more than one transmitter. The several transmitters could be for use with other products manufactured and/or distributed by the entity distributing the present invention. Each of these transmitters TA, TB, TC and TD is illustrated in FIG. 4. Four decoders 200–206 are provided to give periodic signals in line 64 upon receipt of the specific signal for which the decoders are each set. A decoder will create an output in one of the lines 200a, 202a, 204a or 206a according to the transmitter in the vicinity of unit 10. A key decoder 210 identifies the proper key K inserted into one of the key ports 220, 222, 224 or 226 as shown in FIGS. 1 and 5. Key K inserted into port 220 is first identified as a proper key by decoder 210. If the proper key is present, a signal light 230 is activated and a coded signal is received on line 240 from a particular one of the several transmitters or personal identification devices, as shown in FIG. 4. By using the proper key K an enable signal appears on one of the lines 250, 252, 254, 256 to enable one of the decoders 200–206. The enable lines condition the decoders for receipt of the next decoded signal and for setting of the decoder to that signal code. When the decoder has been programmed with a new code, light 230 is activated indicating that there has been a coding of the unit 10 to the particular transmitter in the vicinity of the motor vehicle. Unit 10 operates in accordance with the previous discussion. As one of the transmitters having a code set into one of the decoders 200–206 is brought into the vicinity of the vehicle, the signal S causes periodic pulses in line 64.

Figure 6:
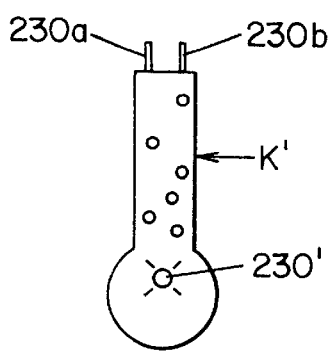
FIG. 6 is a side elevational view of a coded key of the type which is used for the embodiment of the invention as shown in FIG. 4.

In practice, a key similar to the key K illustrated in FIG. 1 is employed. In that instance, light 235 is mounted on the key itself. Another key arrangement is illustrated in FIG. 6, wherein key K' has physical decoding dimples or recesses and a light 230' powered by leads 230a, 230b. In summary, a key is placed into one of the ports shown in FIG. 5 which activates a selected one of the decoders 200–206 corresponding to the port receiving the key. The key must be identified with a particular unit 10 by the code on the key. In that situation, the decoder corresponding to the key port is loaded with the particular code of one of the transmitters shown in FIG. 4. Consequently, several transmitters can be employed for operating the anti-theft device constructed in accordance with the present invention.

Figure 7:
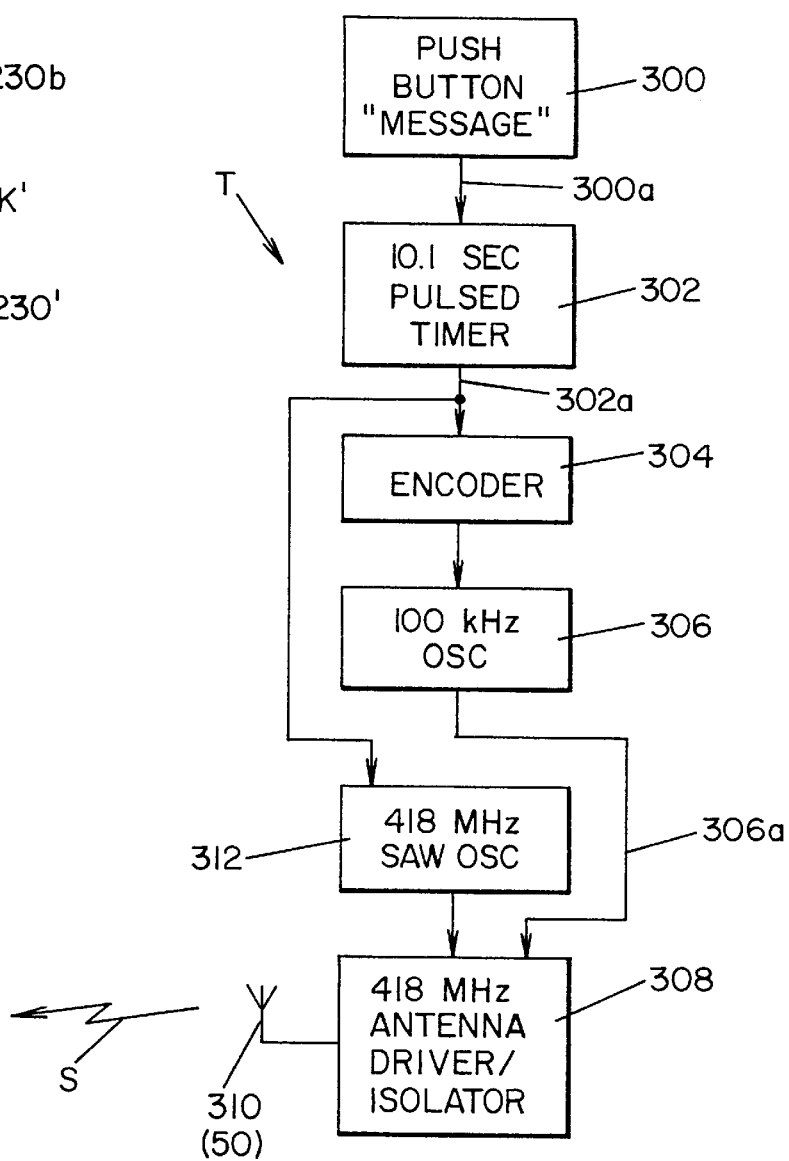
FIG. 7 is a block diagram showing the electrical elements of the personal identification device, or PID, employed in the preferred embodiment of the present invention.
Figure 8:
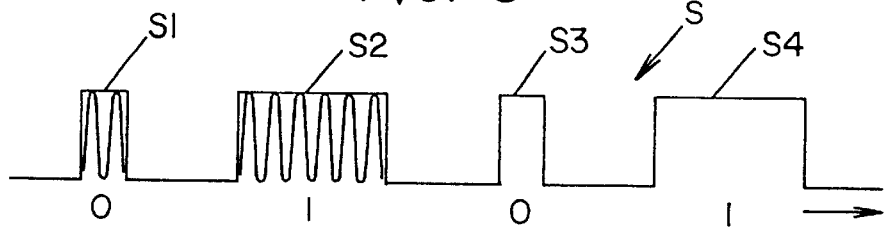
FIG. 8 is a representative coded transmitted signal of the type used in the present invention and as created by the transmitter schematically illustrated in FIG. 7.

The small personal identification unit or transmitter T is illustrated in FIG. 7 wherein the first stage is the "message stage which creates a continuous signal in line 300a. This stage 300 could also be employed for use with the key K for learning the particular code of transmitter T. Under normal conditions, continuous power is applied through line 300a to the pulse timer 302. This pulse timer creates a signal in line 302a each 10.1 seconds. This signal is converted to the desired unique coded signal by encoder 304 to produce a series of binary signals which are directed to the 100 kHz oscillator 306. The output of the oscillator is a series of small or long pulses indicative of the logic 0 and a logic 1, respectively, of a binary coded signal. The coded signal is directed through line 306a to the antenna driver isolator 308 so that each 10.1 seconds an electromagnetic coded signal unique to transmitter T is transmitted from antenna 310, illustrated in FIG. 2 as antenna 50. To prevent radio interference, the signal on antenna 310 is provided with a carrier 312 having a frequency of 418 MHz. The resulting signal is a 100 kHz decoded serial signal with a 418 MHz carrier. This signal occurs each 10.1 seconds to reset timing stage 70 periodically as transmitter T is in the vicinity of unit 10 on the motor vehicle being controlled. It is possible that other transmitting devices could be employed to periodically reset the timer 70. The transmitter T as illustrated in FIG. 5 produces signal S as shown in FIG. 8 and is the preferred embodiment. This signal has a series of binary numbers defined by short pulses S1, S3 and long pulses S2 and S4.

Figure 9:
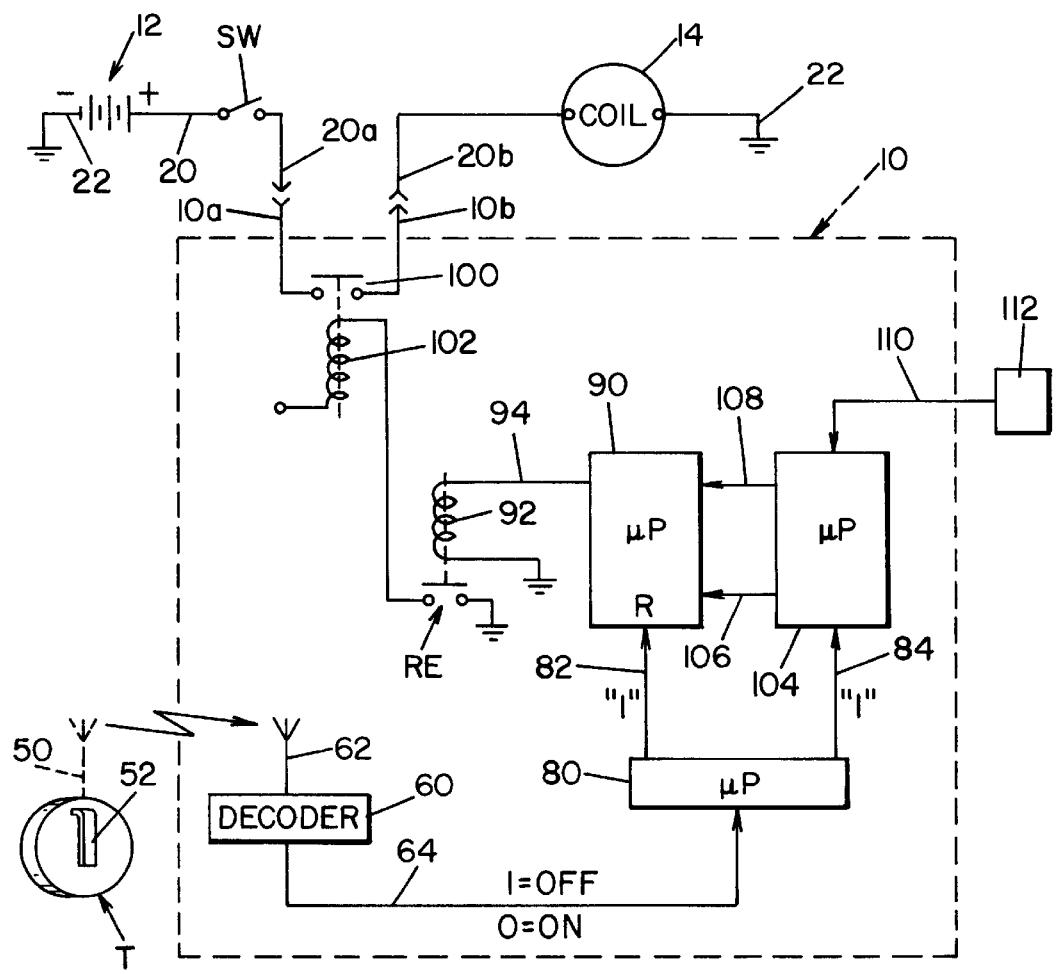
FIG. 9 is a wiring diagram similar to FIG. 2 and schematically illustrating another preferred embodiment of the present invention.
Figure 10:
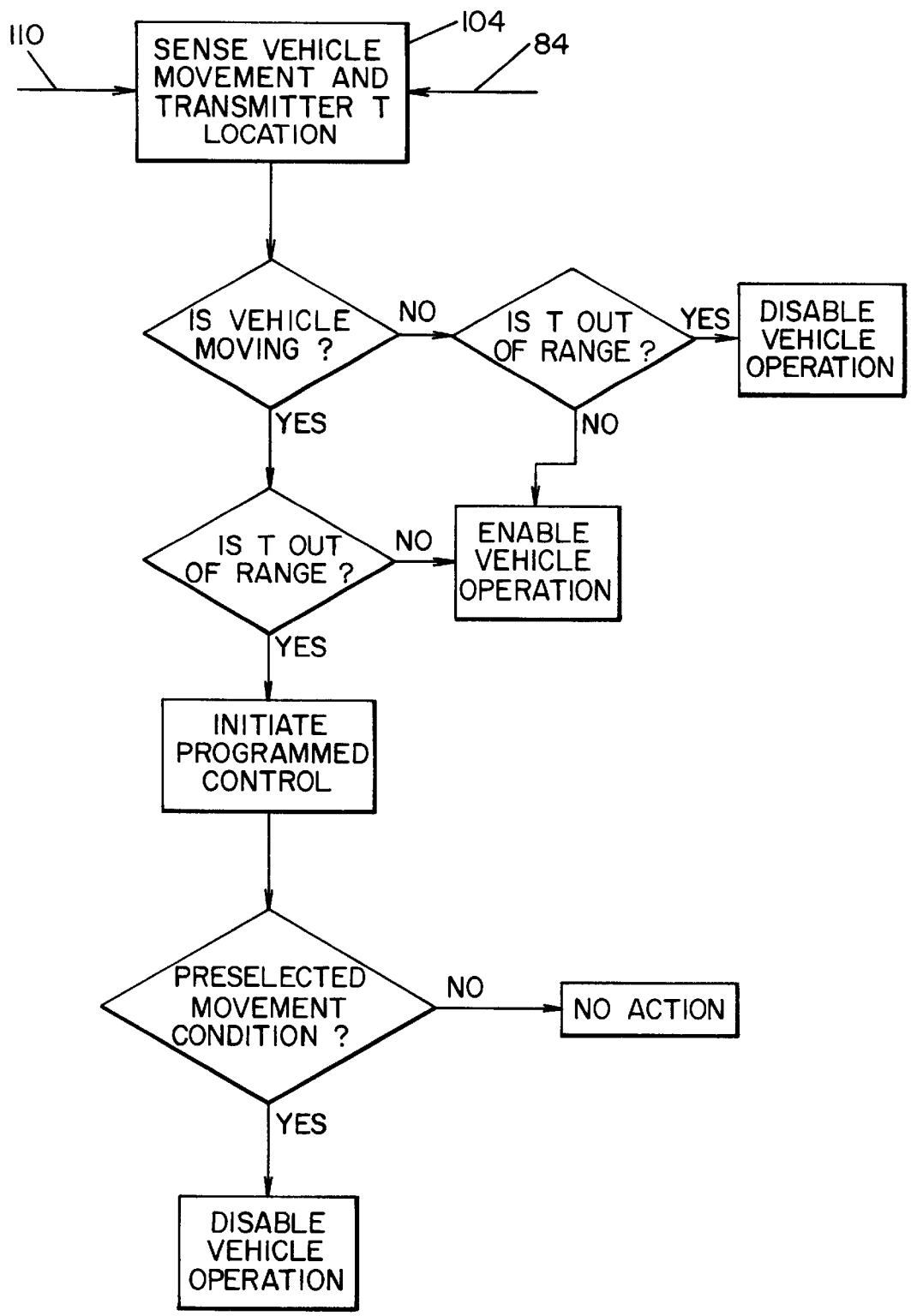
FIG. 10 is a flow chart of the programmed control for vehicle shut down in the embodiment of FIG. 9.

Referring now to FIG. 9, a schematic wiring diagram of a modified control unit 10 is illustrated. With the exception of the modifications described below, the control unit and transmitter T correspond to the control unit and transmitter illustrated in FIG. 2 and described hereinabove. Accordingly, like numerals appear in FIG. 9 with respect to identifying corresponding parts of the latter components. The primary function of timer 70 in the embodiment illustrated in FIG. 2 is to delay initiation of the vehicle inhibiting operation in conjunction with hijacking of a vehicle so that shutdown of the latter occurs after the vehicle has moved a considerable distance from the authorized operator to assure the latter's safety. As will become apparent hereinafter, the function of timer 70 can be accomplished otherwise in the present embodiment, whereby control unit 10 in FIG. 9 does not include the timer. Accordingly, the "within range" or "out-of-range" signals outputed through line 64. from decoder 60 are inputed directly to microprocessor stage 80 and function in connection therewith in the same manner as described in conjunction with the embodiment illustrated in FIG. 2 without the time delay provided by timer 70.

In the embodiment illustrated in FIG. 9, the microprocessor used in control unit 10 includes stage 104 having outputs 106 and 108 to stage 90, an input through line 110 from an electronic speed sensing device 112, and an input through line 84 from stage 80 of the microprocessor. Speed sensing device 112 is operable in response to movement of the vehicle to output a signal through line 110 which is proportional to the rate of movement or speed of the vehicle, and stage 104 of the microprocessor is programmed to be operable in response to the occurrence of two events occurring during hijacking of the vehicle by an unauthorized operator to output a signal through line 108 to stage 90 to initiate the stall sequence described hereinabove with regard to inhibiting operation of the vehicle. The two events are removal of transmitter T from the vicinity of the vehicle, which occurs when the vehicle is commandeered from the authorized operator and driven away by a hijacker, and the occurrence of a predetermined condition of movement of the vehicle as the latter is driven away by the hijacker. At the same time, stage 104 is also operable in response to parking of the vehicle by an authorized operator and movement of the transmitter beyond the vicinity of the vehicle to shift the control unit to the second condition thereof described hereinabove and in which operation of the motor vehicle is inhibited. Thus, operation of the vehicle is inhibited in the latter situation independent of a signal indicative of vehicle movement.

More particularly with regard to the foregoing functions, and as will be appreciated from the foregoing description of the embodiment illustrated in FIG. 2, when an authorized operator parks the vehicle and leaves the vicinity. thereof with transmitter T, a logic "1" is outputed through line 84 from microprocessor stage 80 and in the present embodiment is inputed to stage 104 of the microprocessor. Since the vehicle is stopped, there is no output signal through line 110 indicative of vehicle movement, whereby stage 104 outputs a signal through line 106 to stage 90 to initiate the inhibit operation as described hereinabove with respect to FIG. 2. When the authorized operator moves transmitter T back into the vicinity of the vehicle, the logic "1" signal on line 82 from stage 80 to stage 90 resets the latter as described hereinabove to enable operation of the vehicle. Assuming that the authorized operator has entered the vehicle and started the motor and is then physically ejected from the vehicle by a hijacker who drives away, the logic "1" will again be communicated to stage 104 through line 84 when the vehicle moves out of range with respect to transmitter signal S, and stage 104 also receives a signal through line 110 proportional to the speed of the vehicle as sensed by speed sensing device 112. When stage 104 receives both "vehicle moving" and "out-of-range" signals it is programmed to then respond to a preselected condition of movement of the vehicle and, upon occurrence of the preselected condition, to output a control signal through line 108 to stage 90 to initiate the vehicle inhibiting operation. Thus, when the authorized operator parks and leaves the vehicle, there is no "vehicle moving" signal to stage. 104 whereby, the "out-of-range" signal ultimately outputed from decoder 60 through line 64 to stage 80 of the microprocessor produces the logic "1" in line 84 to stage 104 which, in the absence of a "vehicle moving" signal outputs a control signal through line 106 to stage 90 to initiate the vehicle inhibiting operation. Likewise, when the authorized operator is in the vehicle and driving the same, whereby transmitter T is within the vicinity of the vehicle, the decoder output through line 64 to microprocessor stage 80 produces the logic "1" in line 82 by which the vehicle is rendered operable, and there is no "out-of-range" signal to stage 104 and, accordingly, no output from stage 104 to stage 90.

The preselected condition of movement of the vehicle which microprocessor stage 104 is programmed to respond to by outputting a control signal through line 108 is intended to provide for vehicle shutdown to occur after a hijacker drives the vehicle away from the scene of the hijacking and in a manner which optimizes safety for the authorized operator of the vehicle from whom the vehicle has been commandeered as well as minimizing the potential for damage to the vehicle and to other vehicles and/or pedestrians who may be in the vicinity of the hijacked vehicle when the disabling function takes place. A programmed condition of movement of the vehicle in this respect can be based on a wide variety of formats. For example, stage 104 of the microprocessor can be programmed to output the control signal through line 108 to stage 90 when the vehicle accelerates and decelerates a preselected number of times through a predetermined speed, such as 5 mph as determined by the input signal through line 110 from speed sensing device 112. Since it is the intention in accordance with this embodiment to avoid shutdown or even initiation of shutdown of a hijacked vehicle traveling at a high rate of speed, it is preferred that the speed of the hijacked vehicle at which the control signal is transmitted through line 108 to stage 90 be less than 10 mph and, most preferably, at or below 5 mph. Since it is also the intention to protect the authorized operator from an irate hijacker by providing for shutdown to occur after the vehicle has moved a considerable distance from the point of hijacking, the number of accelerations and/or decelerations through the preselected rate of movement can be selected such that shutdown occurs after the vehicle has traveled a sufficient distance to so optimize protection of the authorized operator. Factors controlling the number selection in this respect include the anticipated locations of car hijacking. For example, since a considerable number of hijackings take place in shopping malls or store parking lots or on a city street at a stop light or stop sign, it is obvious that the vehicle will initially accelerate through the preselected speed as the hijacker drives away with the vehicle. If the hijacker has to slow down or stop at the parking lot exit or at a subsequent stop sign or stop light, the vehicle will then decelerate through the selected speed and, at this point, the vehicle may not be sufficiently removed from the site of the hijacking so as to provide the desired protection for the authorized operator. Thus, it may be desirable to select the third or fourth or even a greater number of movements of the vehicle through the preselected speed before outputing the control signal by which operation of the vehicle is inhibited.

At the same time, a safe distance between the authorized operator and the hijacked vehicle prior to disabling operation of the latter can be achieved through the use of a timer such as timer 70 described herein in conjunction with FIG. 2. In connection with such a timer, stage 104 could be programmed to output the control signal through line 108 at the first occurrence of acceleration or deceleration of the vehicle through the preselected speed following input of the delayed out-of-range signal through line 84. Still further, and again independent of a timer, since the signal through line 110 from speed sensing device 112 is proportional to the speed of the vehicle, the magnitude of the signal increases during acceleration and decreases during deceleration, whereby stage 104 of the microprocessor can be programmed to respond to a predetermined number of sequential accelerations and decelerations through the preselected speed, to a predetermined number of accelerations through the preselected speed, or to a predetermined number of decelerations of the vehicle through the selected speed. The foregoing are only a few of the possible programming formats for stage 104 of the microprocessor and it will be apparent therefrom that others can be readily devised to achieve the intended purpose in accordance with the invention.

Using 5 mph as the preselected rate of movement for the vehicle and 3 consecutive accelerations and decelerations of the vehicle through 5 mph, whereby the programmed condition of movement of the vehicle is 3 consecutive accelerations and decelerations of the vehicle through a speed of 5 mph, the following operation of the anti-theft device under normal circumstances and following hijacking of a vehicle will be understood from the foregoing description taken in connection with FIG. 9 and the flow chart illustrated in FIG.

10. Assuming that an authorized operator of the vehicle carrying transmitter T is within the vicinity of the vehicle, signal S from the transmitter is received by decoder 60 which transmits an enabling signal through line 64 to stage 80 of the microprocessor which in turn causes a logic "1" in line 82 to stage 90, thus enabling operation of the vehicle as described hereinabove in conjunction with FIG. 2. When the operator is driving the vehicle, stage 104 senses movement of the vehicle via speed sensor 112 and line 110 but, since the transmitter is on board, does not receive an out-of-range signal through line 84 and thus the control unit remains in the condition enabling operation of the vehicle. If the operator parks the vehicle and leaves with the transmitter so as to move the latter out of its range of communication with the control unit an out-of-range signal is transmitted to stage 104 of the microprocessor through line 84 as described hereinabove. At this time, however, there is no input signal to stage 104 through line 110 indicating movement of the vehicle, whereby stage 104 is operable to output a control signal through line 106 to stage 90 of the microprocessor, whereby the control unit is shifted to the condition disabling operation of the vehicle as described hereinabove in connection with FIG. 2. When the authorized operator moves back into the vicinity of the vehicle, control unit 10 shifts back to the condition thereof enabling operation of the vehicle. Assuming at this time that a hijacker confiscates the keys from the operator, the hijacker can enter the vehicle, start the engine and drive away in that control device 10 is in the vehicle operation enabling condition as a result of transmitter T being in the vicinity thereof. As the hijacker drives away, movement of the vehicle is sensed by stage 104 of the microprocessor through the output signal from speed sensing device 112 through line 110. When the hijacker has driven the vehicle out of the vicinity of the transmitter, decoder 60 inputs a signal to microprocessor stage 80 by which the latter outputs an out-of-range signal through line 84 to microprocessor stage 104 and which signal together with the input signal through line 110 initiates the vehicle movement condition program by which the vehicle operation is subsequently disabled. More particularly in this respect, with regard to the foregoing program example, the third time that the vehicle speed as indicated by the signal through line 110 passes through 5 mph, stage 104 outputs a control signal through line 108 to stage 90 by which disabling of the operation of the vehicle is initiated. While it is preferred, even with such enabling being initiated at a low speed of the vehicle, to disable the vehicle through a stall sequence as described hereinabove in connection with the embodiment illustrated in FIG. 2, it will be appreciated that disabling of the vehicle can take place immediately by opening ignition circuit switch 100.

While it is preferred to employ a transmitter as described hereinabove which is passive in operation with respect to shifting vehicle control unit 10 between the vehicle operation enabling and inhibiting conditions thereof, it will be appreciated that the embodiment of the present invention illustrated in FIG. 9 would be operable with a transmitter requiring manual manipulation of a push button or the like by an authorized operator to achieve shifting of the vehicle control unit between its two conditions. In this respect, for example, consecutive depressions of the transmitter push button would transmit signals to the receiver in the vehicle control unit by which the latter would sequentially shift between the two conditions. In conjunction with a hijacking of the vehicle from the operator, assuming the control unit to be in the condition enabling operation of the vehicle, the authorized operator would push the transmitter button as the vehicle is driven away producing a control signal corresponding to the out-of-range signal produced when the passive transmitter is separated from the vehicle and which control signal would cause the logic "1" signal from microprocessor stage 80 through line 84 to stage 104.

It will be appreciated that the modifications referred to above, as well as other modifications, can be made with regard to this embodiment without departing from the principals of the invention, whereby it is to be understood that the foregoing descriptive matter with respect thereto is to be interpreted merely as illustrative and not as a limitation.

Having thus described the invention, it is claimed:

1. An anti-theft device for disabling a moving vehicle comprising, a vehicle control unit mounted on said vehicle, said vehicle control unit having a first condition allowing operation of said vehicle and a second condition inhibiting operation of said vehicle, determining means for determining the rate of movement of said vehicle, transmitter means to be carried by an authorized operator of said vehicle, means for sensing the presence of said transmitter means in the vicinity of said vehicle, and means including said determining means responsive to said sensing means sensing that said transmitter means is removed from the vicinity of said vehicle for shifting said vehicle control unit into said second condition upon one of accelerating and decelerating movement of said vehicle through a predetermined rate of movement, wherein said determining means includes means for determining successive accelerations and decelerations of said vehicle through said predetermined rate of movement and said means for shifting said vehicle control unit to said second condition includes means to shift said control unit at a predetermined one of a predetermined number of successive accelerations and decelerations through said predetermined rate of movement.

2. An anti-theft device for disabling a moving vehicle, said device including a personal identification unit to be carried by an authorized operator of said vehicle, means for sensing the presence of said unit in the vicinity of said vehicle, means for determining the rate of movement of said vehicle, and means for inhibiting operation of said vehicle when said sensing means and said determining means indicate that said unit is removed from the vicinity of said motor vehicle and said motor vehicle is moving at a predetermined rate of movement, wherein said determining means includes means for determining successive accelerations and decelerations of said vehicle through said predetermined rate of movement and said means for inhibiting operation of said vehicle includes means to inhibit said vehicle at a predetermined one of a predetermined number of successive accelerations and decelerations through said predetermined rate of movement.

3. A device for thwarting hijacking of motor vehicles, said device comprising means including transmitter means to be carried by an authorized operator of said vehicle for producing a first control signal when said transmitter means is removed from the vicinity of said vehicle, means for sensing a preselected speed condition of said vehicle and producing a second control signal representative of said speed condition, and means responsive to said first and second control signals for inhibiting operation of said vehicle, wherein said preselected speed condition is a predetermined one of a plurality of successive accelerations of said vehicle through a predetermined rate of speed.

4. A device for thwarting hijacking of motor vehicles, said device comprising means including transmitter means to be carried by an authorized operator of said vehicle for producing a first control signal when said transmitter means is removed from the vicinity of said vehicle, means for sensing a preselected speed condition of said vehicle and producing a second control signal representative of said speed condition, and means responsive to said first and second control signals for inhibiting operation of said vehicle, wherein said preselected speed condition is a predetermined one of a plurality of successive decelerations of said vehicle through a predetermined rate of speed.

5. A method of thwarting hijacking of a moving motor vehicle comprising the steps of:
 a) providing a vehicle control unit on said vehicle having a first condition allowing operation of said vehicle and a second condition inhibiting operation of said vehicle;
 b) providing means including transmitter means carried by an authorized operator of said vehicle for producing a first shifting signal for shifting said control unit to said second condition when said transmitter means is removed from the vicinity of said vehicle;
 c) sensing for a preselected speed condition of said vehicle and providing a second shifting signal is response to sensing said speed condition; and
 d) shifting said control unit to said second condition in response to said first and second shifting signals, wherein said sensing step includes sensing successive accelerations and decelerations of said vehicle through a predetermined rate of movement and producing said second shifting signal at a predetermined one of a predetermined number of successive accelerations and decelerations through said predetermined rate of movement.

* * * * *